United States Patent
Armellino

[19]

[11] Patent Number: 5,878,795
[45] Date of Patent: Mar. 9, 1999

[54] FUEL SPILL COLLECTOR DEVICE

[76] Inventor: Gary Armellino, 150 Washington St., St. Augustine, Fla. 32084

[21] Appl. No.: 863,143

[22] Filed: May 27, 1997

Related U.S. Application Data

[63] Continuation-in-part of Ser. No. 419,047, Apr. 10, 1995, Pat. No. 5,662,149.

[51] Int. Cl.⁶ ..................................................... B65B 3/00
[52] U.S. Cl. .............................................. 141/86; 220/86.2
[58] Field of Search .................................. 141/59, 86, 88, 141/312; 220/86.1, 86.2

[56] References Cited

U.S. PATENT DOCUMENTS

| | | |
|---|---|---|
| 2,718,344 | 9/1955 | Troster . |
| 3,334,779 | 8/1967 | Smith ..................................... 220/86.2 |
| 3,467,274 | 9/1969 | Schmitt . |
| 3,967,660 | 7/1976 | Russell ..................................... 141/95 |
| 4,079,952 | 3/1978 | Nishio et al. ........................... 220/86.2 |
| 4,424,839 | 1/1984 | Otani et al. ............................. 220/86.2 |
| 4,651,889 | 3/1987 | Uranishi et al. ........................ 220/86.2 |
| 4,770,317 | 9/1988 | Podgers et al. . |
| 4,795,050 | 1/1989 | Smith et al. ............................ 220/86.2 |
| 4,977,936 | 12/1990 | Thompson et al. ..................... 141/312 |
| 5,027,868 | 7/1991 | Morris et al. ............................. 141/59 |
| 5,035,272 | 7/1991 | Kawase ................................... 141/312 |
| 5,040,575 | 8/1991 | Oeffling et al. ........................ 220/86.2 |
| 5,074,343 | 12/1991 | Tyree et al. . |
| 5,168,908 | 12/1992 | Boyum . |
| 5,217,052 | 6/1993 | Sharp . |
| 5,230,372 | 7/1993 | Westphal . |
| 5,234,039 | 8/1993 | Aoshima et al. ....................... 141/312 |
| 5,277,234 | 1/1994 | Warster . |
| 5,291,924 | 3/1994 | Sausner et al. ......................... 141/312 |
| 5,297,595 | 3/1994 | Haile et al. ............................... 141/59 |
| 5,322,099 | 6/1994 | Langlois . |
| 5,385,180 | 1/1995 | Wittman . |
| 5,503,199 | 4/1996 | Whitley et al. . |
| 5,538,055 | 7/1996 | Kunz et al. ............................. 141/312 |

*Primary Examiner*—J. Casimer Jacyna
*Attorney, Agent, or Firm*—Michael I. Kroll

[57] ABSTRACT

A fuel spill collector device for connection between a fuel line and fuel fill fitting, for collecting fuel inserted into the fuel line by a fuel pump nozzle. The fuel spill collector device includes a hollow body having an open top end and an open bottom end; a nozzle receiving member positioned at the open bottom end of the hollow body and connected to the fuel line for receiving the fuel pump nozzle during fueling; and an entrance flow guide member positioned at the open top end of the hollow body connected to the fuel fill fitting for releasably sealing the fuel pump nozzle inserted therein. The fuel pump nozzle is positioned to extend through the entrance flow guide member, the hollow body and the nozzle receiving member to pump fuel into the fuel filler line, wherein a fuel back splash will be caught within the hollow body. The releasable seal between the entrance flow guide member and the fuel pump nozzle will prevent any fuel from exiting the hollow body, suppress fumes and greatly decrease fueling time by utilizing venturi and gravitational return effects.

7 Claims, 6 Drawing Sheets

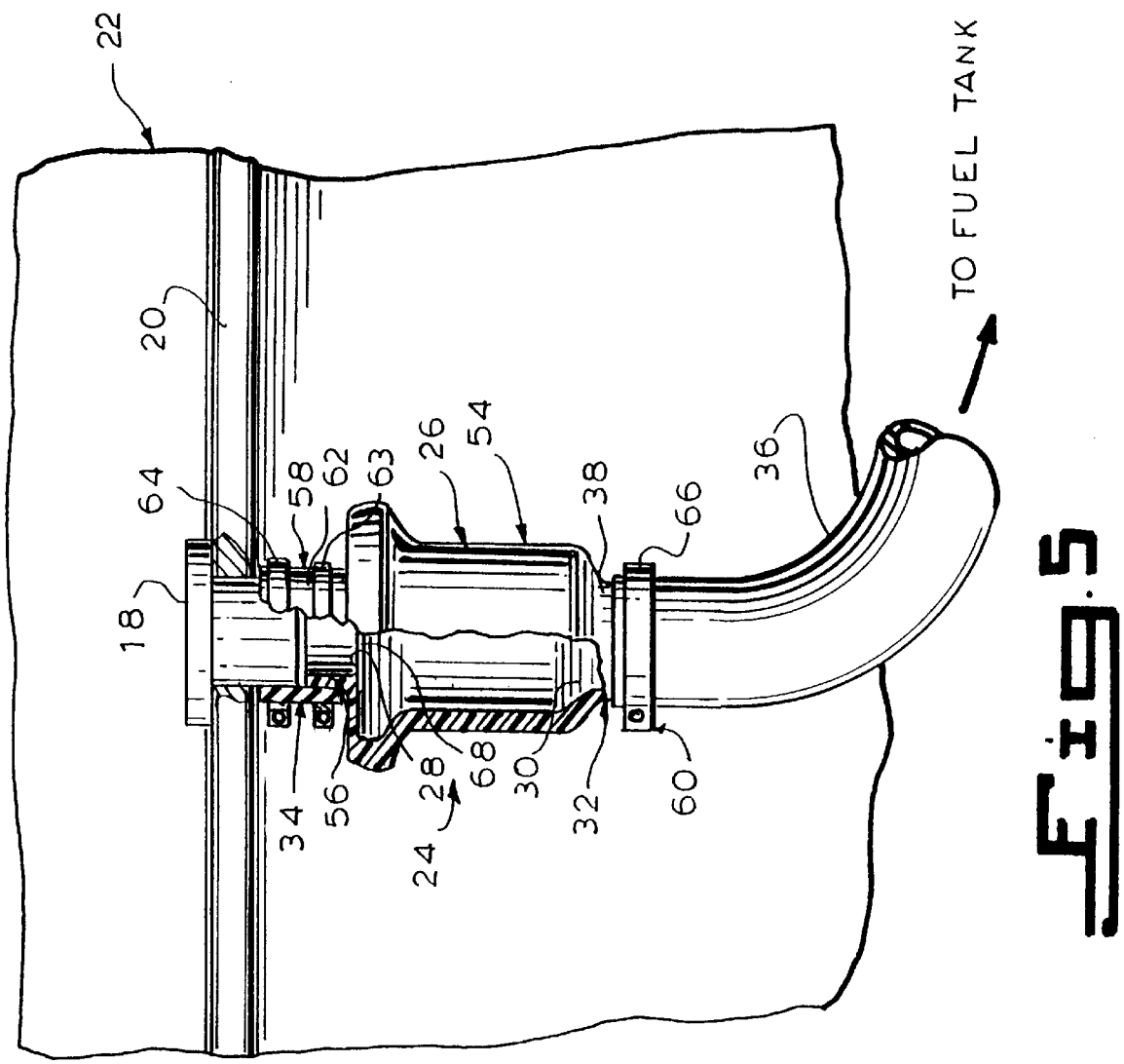

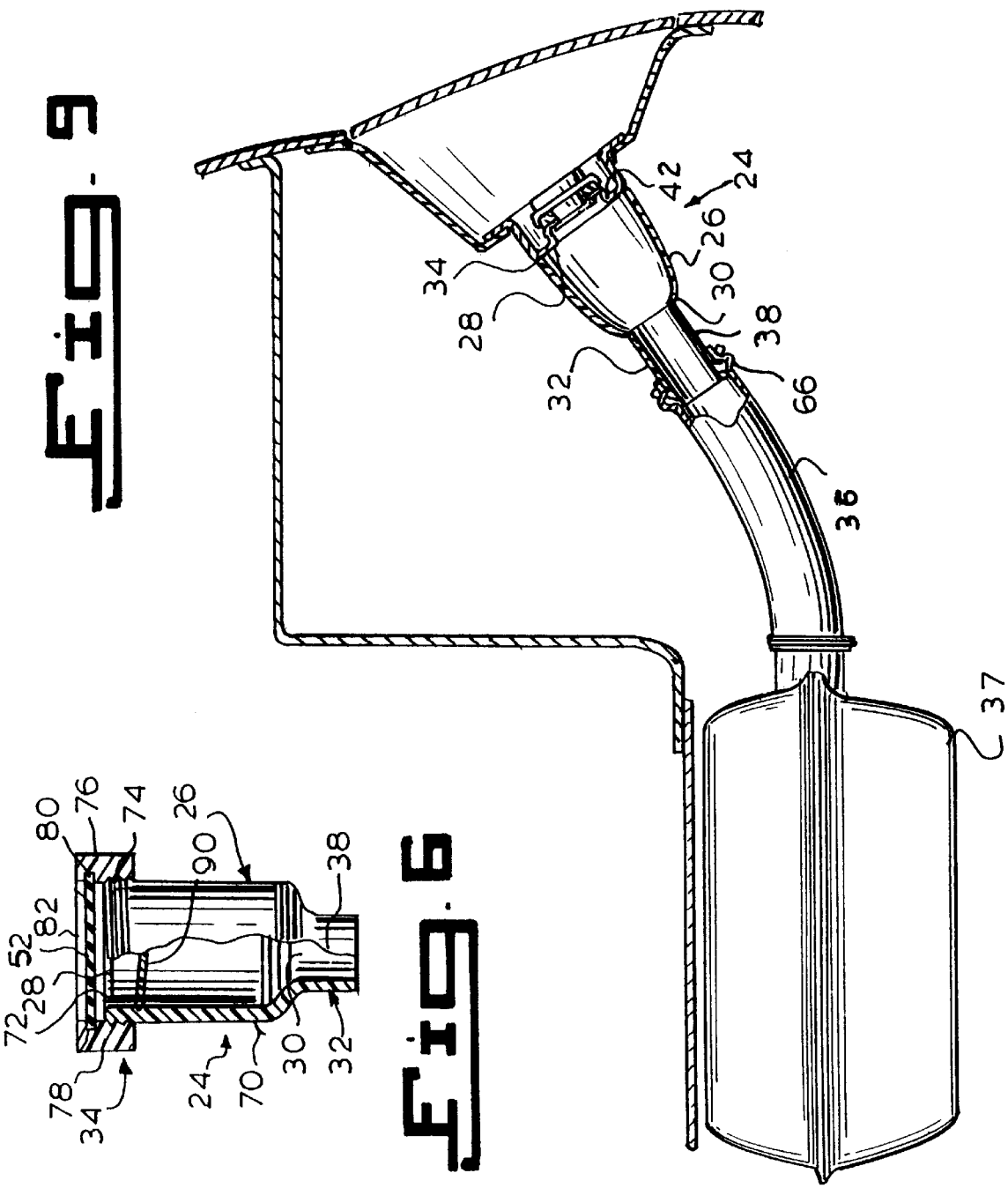

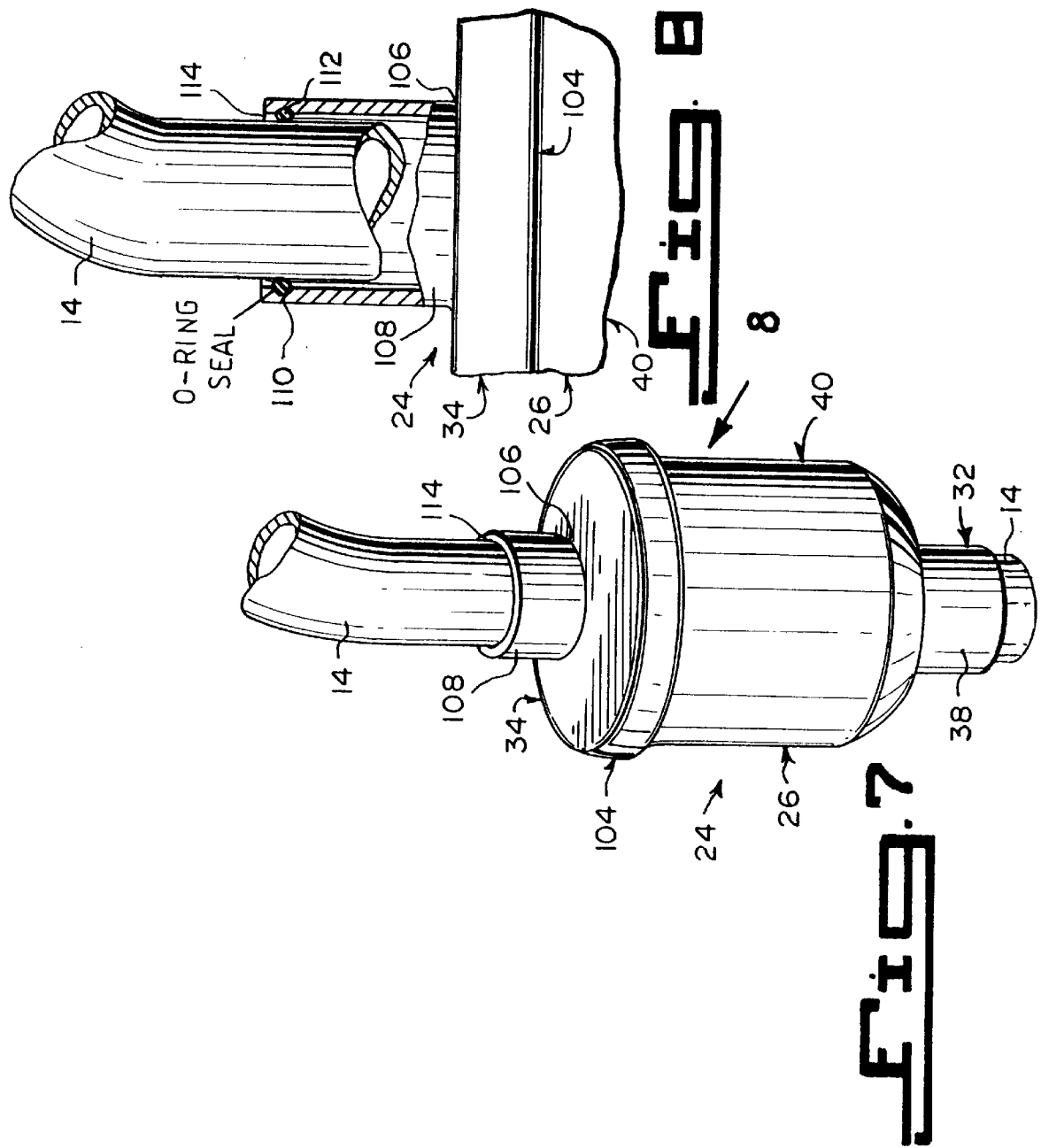

FUEL SPILL COLLECTOR DEVICE

This application is a continuation-in-part of application Ser. No. 08/419,047 filed on Apr. 10, 1995, U.S. Pat. No. 5,662,149.

BACKGROUND OF THE INVENTION

1. Field of the Invention

The instant invention relates generally to funnels and more specifically it relates to a fuel spill collector device.

2. Description of the Prior Art

Numerous funnels have been provided in the prior art. For example, U.S. Pat. Nos. 5,074,343 to Tyree, Jr.; 5,168,908 to Boyum; 5,277,234 to Warstler and 5,385,180 to Wittman all are illustrative of such prior art. While these units may be suitable for the particular purpose to which they address, they would not be as suitable for the purposes of the present invention as heretofore described.

U.S. Pat. No. 5,074,343

Inventor: Louis Tyree, Jr.

Issued: Dec. 24, 1991

Filling units for filling small tanks or the like with gasoline, kerosene, or other flowable materials which attach an inlet to such a tank. When the filling unit is in a fill position, a displacer section occupies a substantial volume within the tank. It allows the person filling the tank to supply the liquid until the tank will accept no more and the liquid reaches a predetermined level in a funnel portion of the filler. Thereafter, removal of the displacer section from the tank, as by sliding a section of the overall unit upward, allows the liquid in the funnel to enter the tank and fill the volume evacuated by the displacer section to complete the filling without any spillage. The overall unit may be removed from the tank each filling operation, or it may be designed to include a protective cap that fits over the upward protruding portion of the unit, allowing the unit to remain mounted on the tank.

U.S. Pat. No. 5,168,908

Inventor: Glenn Boyum

Issued Dec. 8, 1992

A non-spill funnel for introducing liquids and flowable materials into tanks or containers which includes a bowl which is integrally formed with a pour spout or nozzle. The nozzle includes an outwardly spaced arcuate flange which extends in spaced relationship thereto, for purposes of engaging the sidewall of the fill spout opening into the tank or container, so as to retain the nozzle against the sidewall thereof. A visual inspection may be made as to the level of liquid or other flowable material relative to the opening.

U.S. Pat. No. 5,277,234

Inventor: Christopher L. Warstler

Issued: Jan. 11, 1994

A funnel includes a truncated conical funnel head directed into a cylindrical guide conduit. The guide conduit and funnel head are oriented about a predetermined axis. A plurality of spaced parallel channels are directed into the funnel head. The guide conduit extends from a lowermost end of the funnel structure to an uppermost end thereof permitting venting when the funnel is directed within an opening of an associated container.

U.S. Pat. No. 5,385,180

Inventor: Boyd Wittman

Issued: Jan. 31, 1995

A spill inhibiting funnel system is described that has stepped fins and blades extending respectively, from the outer and inner surfaces of a tapered funnel body. The fins allow the funnel to be variably positioned with respect to a receiving container's opening in a secure fashion to prevent spills. Likewise, the stepped blades allow a pouring container to be securely placed inside the funnel and remain there in an inverted upright or angled position.

SUMMARY OF THE INVENTION

A primary object of the present invention is to provide a fuel spill collector device that will overcome the shortcomings of the prior art devices.

Another object of the present invention is to provide a fuel spill collector device that will prevent a fuel spill when a spout of a fuel pump nozzle is inserting fuel through a fuel filler line.

A further object of the present invention is to provide a fuel spill collector device that may be attached to a fuel filler line in any one of an automobile, boat, airplane, motorcycle and any other device operating through the use of liquid fuel.

An additional object of the present invention is to provide a fuel spill collector device that will catch a fuel back splash, suppress fumes and greatly decrease fueling time, by utilizing venturi and gravitational return effects.

A further object of the present invention is to provide a fuel spill collector device through which a fuel pump nozzle extends to deposit fuel directly in the fuel filler line thereby maintaining the fuel spill collector free of fuel during fueling and able to fully catch a fuel back splash.

A yet further object of the present invention is to provide a fuel spill collector device which forms a seal around the fuel pump nozzle to aid in preventing fuel splash back from exiting the device.

A further object of the present invention is to provide a fuel spill collector device that is simple and easy to use.

A still further object of the present invention is to provide a fuel spill collector device that is economical in cost to manufacture. collector device that is economical in cost to manufacture.

A fuel spill collector device for connection between a fuel line and fuel fill fitting, for collecting fuel inserted into the fuel line by a fuel pump nozzle is disclosed by the present invention. The fuel spill collector device includes a hollow body having an open top end and an open bottom end; a nozzle receiving member positioned at the open bottom end of the hollow body and connected to the fuel line for receiving the fuel pump nozzle during fueling and an entrance flow guide member positioned at the open top end of the hollow body connected to the fuel fill fitting for releasably sealing the fuel pump nozzle inserted therein. The fuel pump nozzle is positioned to extend through the entrance flow guide member, the hollow body and the nozzle receiving member to pump fuel directly into the fuel line, wherein a fuel back splash will be caught within the hollow body. The releasable seal between the entrance flow guide member and the fuel pump nozzle will prevent any fuel from exiting the hollow body, suppress fumes and greatly decrease fueling time by utilizing venturi and gravitational return effects.

Further objects of the present invention will become apparent as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 5 is an elevational view with parts broken away and in section of the instant invention permanently installed between the fuel fill fitting and fuel line of the boat below the deck.

FIG. 6 is an elevational view with parts broken away and in section of the instant invention wherein the entrance flow guide member is attached to the hollow body via a threaded engagement.

FIG. 7 is a perspective view of the present invention incorporating a short tube for creating a releasable seal with the fuel pump nozzle.

FIG. 8 is an enlarged elevational view with parts broken away and in section taken in the direction of arrow 8 in FIG. 7, showing the O-ring seal in greater detail.

FIG. 9 is a cross-sectional view of the fuel spill collector device of the present invention incorporated into the fuel line.

Similar reference characters denote corresponding features consistently throughout the attached drawings.

DETAILED DESCRIPTION OF THE PREFERRED EMBODIMENT

Figure 1:
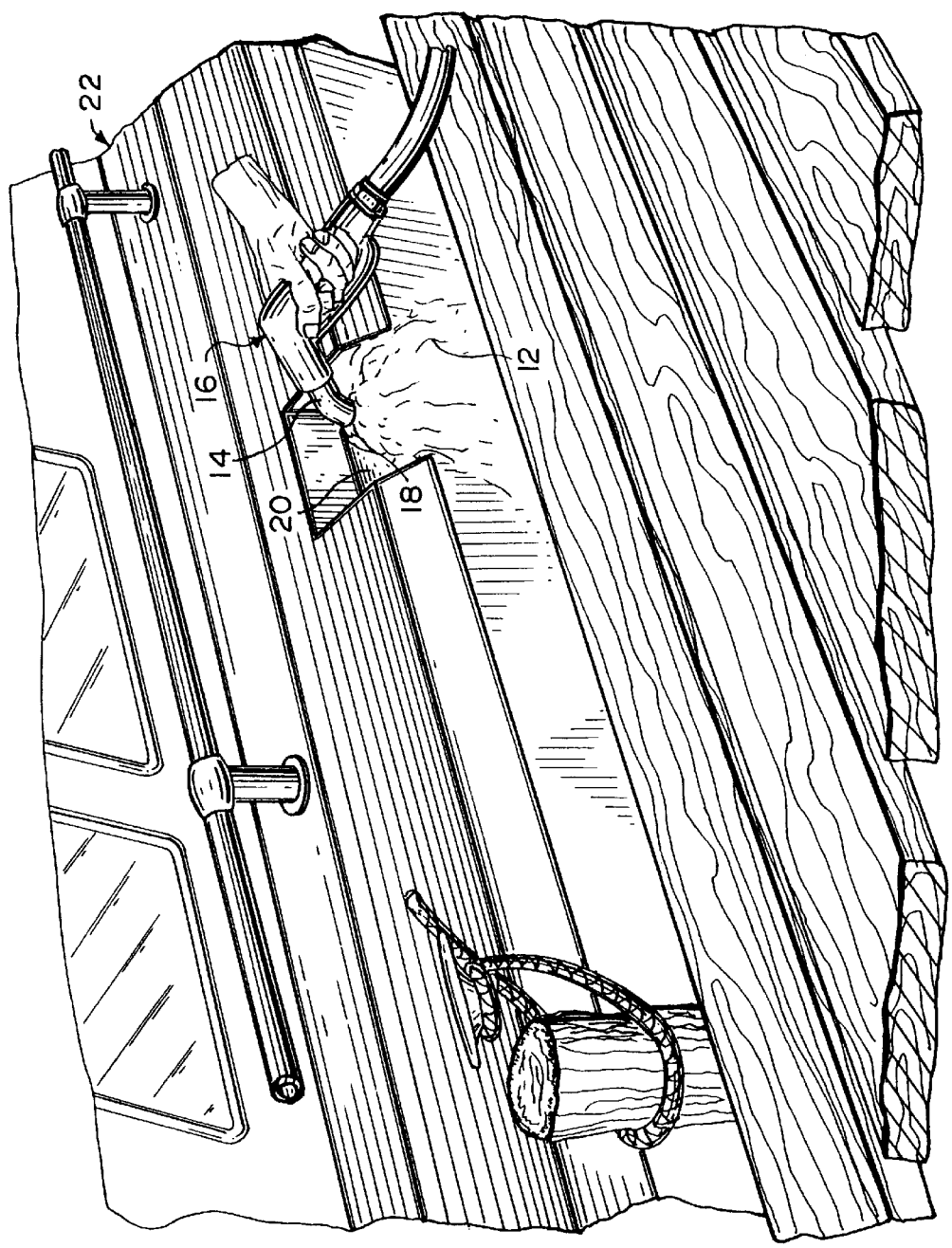
FIG. 1 is a perspective view of the prior art, showing a portion of a boat with a fuel pump nozzle spilling some fuel out of a fuel fill fitting.

Turning now descriptively to the drawings, in which similar reference characters denote similar elements throughout the several views, FIG. 1 illustrates a boat 22 equipped with a prior art fuel fill fitting 18. During fueling a fuel pump 16 is positioned with its nozzle 14 inserted into the fuel fill fitting 18 on the deck 20 of the boat 22. The fuel flowing through the nozzle 14 is deposited in a fuel line for transport through the fuel line to a fuel tank. As the fuel exits the nozzle 14 and enters the fuel line, the pressure of the fuel entering the fuel line causes fuel to "splash back" towards the fuel fill fitting. Thus, when fuel is pumped, "splash back" of the fuel causes a fuel spill 12 to exit the fuel fill fitting 18 and splash onto a deck 20 of the boat 22.

FIG. 9 illustrates the fuel spill collector device of the present invention incorporated into a fuel line. The fuel spill collector device is indicated generally by the numeral 24 and includes a hollow body 26 having an open top end 28 and an open bottom end 30. The hollow body 26 may be of any useful shape. The cylindrical cup shaped form of the hollow body 26 as is illustrated in the figures is for purposes of example only and not meant to limit the scope of the invention in any manner. The circumference of the open top end 28 and open bottom end 30 may vary based upon the size of the fuel line and fuel fill fitting between which the device is connected and the type of vehicle in which the device 24 is incorporated. Furthermore, the circumference of the open top end 28 and open bottom end 30 need not be equivalent.

Figure 2:
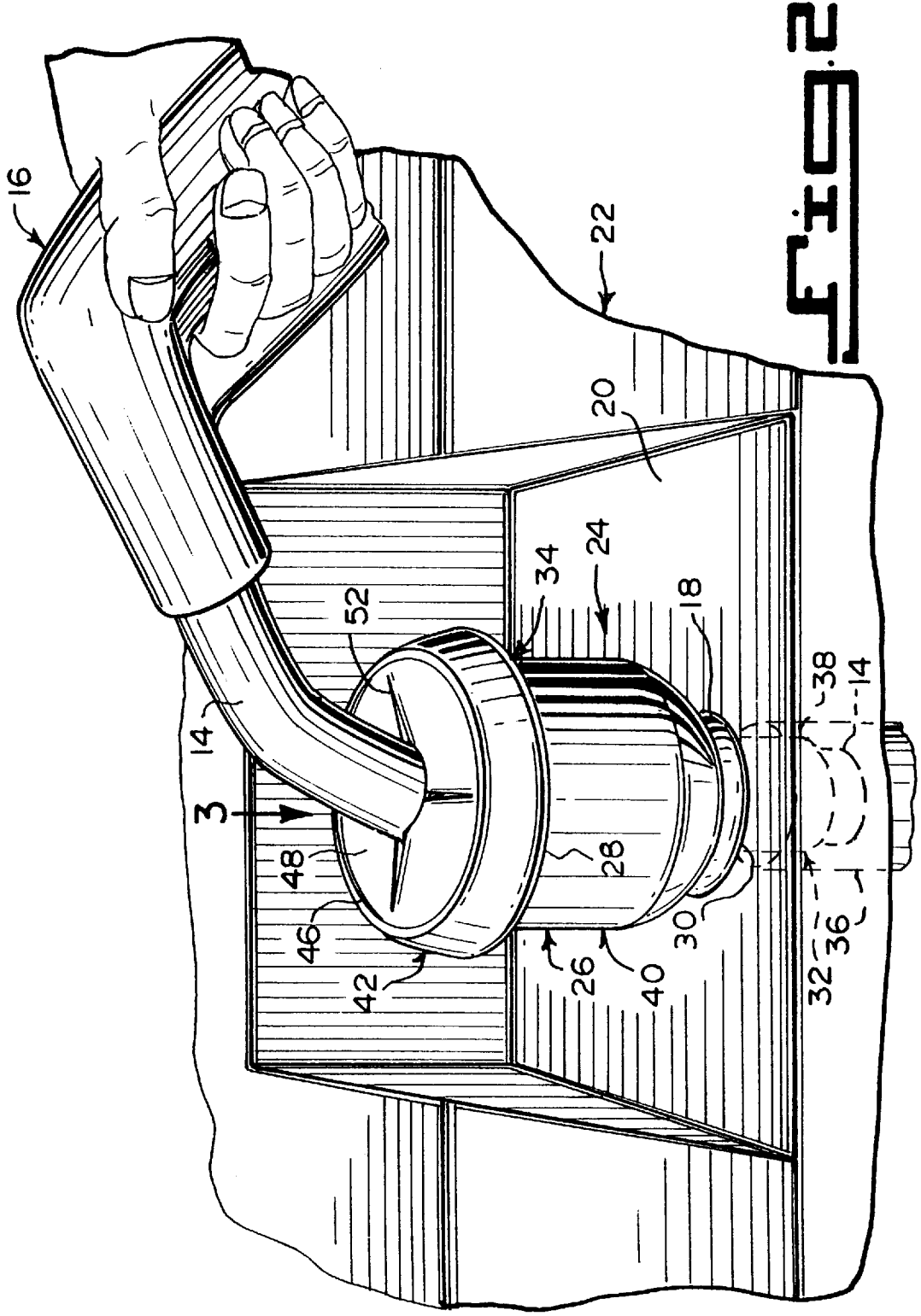
FIG. 2 is a perspective view of the fuel spill collector device of the present invention placed into the fuel fill fitting with the fuel pump nozzle inserted into the entrance flow guide member and all the way through to the fuel line, so as to prevent a fuel spill.
Figure 3:
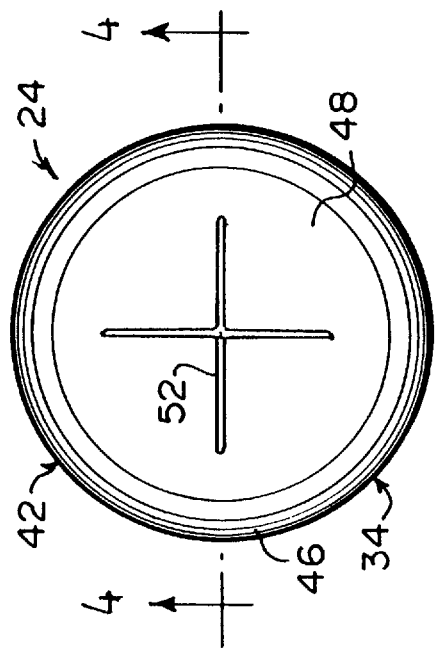
FIG. 3 is a top view of the present invention taken in the direction of arrow 3 in FIG. 2, incorporating a disk-shaped cover for creating a releasable seal with the fuel pump nozzle.
Figure 4:
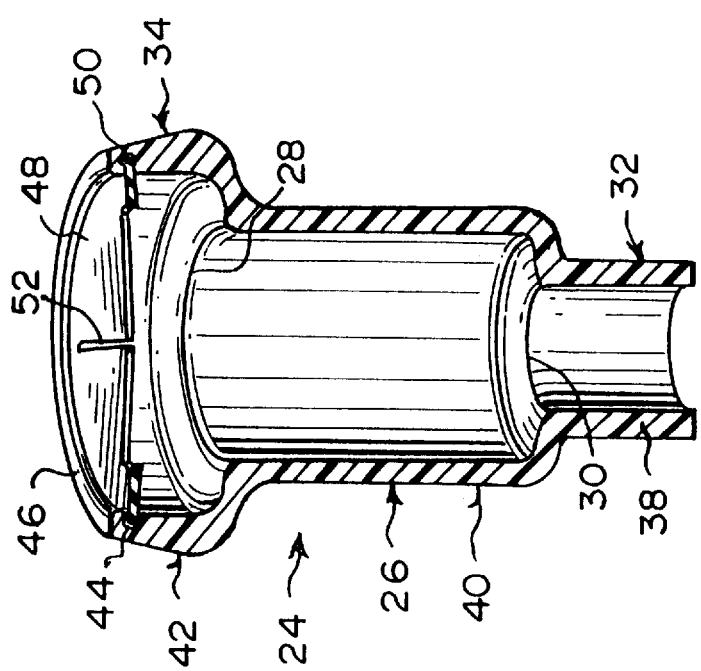
FIG. 4 is a perspective cross sectional view taken generally along line 4—4 in FIG. 3.

The hollow body 26 is illustrated in FIGS. 2 and 4 as a cylindrical cup-shaped housing 40, in which the diameter of the open top end 28 is larger than the diameter of the open bottom end 30. The hollow body 26 will also accommodate any side wall or stringer restrictions. It may be circular and thinner from top to bottom, or thinner, wider and offset. The principle function of the hollow body 26 of the invention applies in almost any type of configuration, when the spout 14 of the fuel pump nozzle 16 is inserted all the way through the hollow body 26.

While a preferred structure and form for the hollow body 26 is shown and described herein, those of ordinary skill in the art who have read this description will appreciate that there are numerous other structures for the hollow body and, therefore, as used herein the phrase "hollow body means for catching splash back of fuel" should be construed as including all such structures as long as they achieve the desired result of catching splash back of fuel, and therefore, that all such alternative mechanisms are to be considered as equivalent to the one described herein.

An entrance flow guide member 34 is positioned at the open top end 28 of the hollow body 26 and is illustrated in FIGS. 2–5. The entrance flow guide member 34 includes of an upper cylindrical collar 42 integral with and extending about the open top end 28 of the hollow body 26. The upper cylindrical collar 42 acts to receive the fuel pump nozzle as it is introduced into the fuel fill fitting 18. The entrance flow guide member 34 is formed to receive and form a sealed fit with a fuel pump nozzle 14 when the fuel pump nozzle 14 is introduced thereto. To form a seal with the fuel pump nozzle 14 a flexible cover may be connected to the upper cylindrical collar 42 having a cross-shaped slit cut therein for receiving a fuel pump nozzle and forming a releasable seal therewith as illustrated in FIGS. 2–6. Alternatively, the seal may be formed using a structure as is illustrated in FIGS. 7 and 8.

While preferred and alternate structures and forms for the entrance flow guide member 34 are shown and described herein, those of ordinary skill in the art who have read this description will appreciate that there are numerous other structures for the entrance flow guide member 34 and, therefore, as used herein the phrase "entrance flow guide member 34 for releasably sealing the fuel pump nozzle within said device" should be construed as including all such structures as long as they achieve the desired result of releasably sealing the fuel pump nozzle within the fuel spill collector device, and therefore, that all such alternative mechanisms are to be considered as equivalent to the one described herein.

The upper cylindrical collar 42 as illustrated in FIG. 4 has an internal ring-shaped groove 44 near its upper edge 46. A disk-shaped flexible cover 48 with a bead 50 about a peripheral edge is carried in an affixed manner within the ring-shaped groove 44. The cover 48 has a cross-shaped slot 52 therethrough for releasably receiving the nozzle 14 of the fuel pump 16.

FIG. 6 illustrates a hollow body 26 in which the diameter of the open top end 28 is larger than the diameter of the open bottom end 30. The open bottom end 30 includes a lower cylindrical collar 38 which is sized to fit into the fuel filler line 36. The entrance flow guide member 34 includes an upper cylindrical collar 72 integral with and extending about the open top end 28 of the hollow body 26. The upper cylindrical collar 72 has an external thread 74 spiraling about an outer side 75 thereof and a cylindrical sleeve 76 is provided including a skirt 77 depending therefrom having a thread 78 spiraling around an inner side 79 thereof. The cylindrical sleeve 76 can thread onto the upper cylindrical collar 72. The cylindrical sleeve 76 further includes an internal ring-shaped groove 80 near its upper edge 82. The disk-shaped flexible cover 48 including the bead 50 about its peripheral edge is carried in an affixed manner within the ring-shaped groove 80. The cover 48 further includes the cross-shaped slot 52 therethrough, to receive the spout 14 of the fuel pump nozzle 16. The entrance flow guide member 34 further includes a deflector plate 90, carried in the hollow body 26 below the open top end 28, to help divert the fuel entering therein.

In FIGS. 7 and 8, the entrance flow guide member 34 includes a cylindrical cap 104, having a central aperture 106 therethrough in lieu of the cross-shaped slot 52. The cap 104 snaps onto the open top end 28 of the hollow body 26. A short tube 108 extends upwardly from the central aperture 106 in the cylindrical cap 104 for receiving the nozzle 14 of the fuel pump 16. The short tube 108 has an internal annular channel 110 thereabout and is sized to receive the nozzle 14 of the fuel pump 16. An O-ring 112 is carried within the annular channel 110 in the short tube 108 near an upper open end 114 thereof providing a releasable seal fit between the nozzle 14 of the fuel pump 16 and the short tube 108. The O-ring 112 aids in preventing fuel coming out of the nozzle 14 from backing out of the short tube 108. The alternative forms for producing the releasable seal between the upper open end 28 and the nozzle 14 of the fuel pump are due to the differing configurations for the fuel filling and fuel line for different types of cars and boats.

A first connecting facility 58 is provided for connecting the upper cylindrical collar 56 to a bottom end of a fuel fill fitting 18 as illustrated in FIG. 5. The first connecting facility 58 includes a flexible tube 62 extending between the bottom end of the fuel fill fitting 18 and the upper cylindrical collar 56. A pair of hose clamps 64 are provided. A first of the pair of hose clamps 63 will seal the flexible tube 62 to the upper cylindrical collar 56 and a second of the pair of hose clamps 64 will seal the flexible tube 62 to the fuel fill fitting connecting the flexible tube 62 between the bottom end of the fuel fill fitting 18 and the upper cylindrical collar 56.

A nozzle receiving member 32 is positioned at the open bottom end 30 of the hollow body 26 for connection to the fuel line 36. The nozzle receiving member 32 is formed as a lower cylindrical collar 38 integral with and extending about the open bottom end 30 of the hollow body 26 as is more clearly illustrated in FIG. 2. The lower cylindrical collar 38 is sized to fit into the fuel filler line 36. A second connecting facility 60 is provided for connecting the lower cylindrical collar 38 to a top end of the fuel filler line 36 and includes a hose clamp 66. The fuel filler line 36 is seated within and connected to the fuel tank 37 via a hose clamp 66 as is illustrated in FIG. 5. A deflector plate 68 is carried in the hollow body 26 below the open top end 28, to help divert the fuel entering therein.

To pump fuel through the fuel filler line 36 for deposit into a fuel tank 37 the nozzle 14 of the fuel pump 16 is inserted into the entrance flow guide member 34 and positioned to extend through the hollow body 26 and into or through the nozzle receiving member 32. A cross-sectional view of the fuel spill collector device 24 connected to the fuel line 36 is illustrated in FIG. 4. The device 24 will prevent the fuel spill 12 by catching a fuel back splash, suppress fumes and greatly decrease fueling time by utilizing venturi and gravitational return effects.

Alternatively, the fuel spill collector device 24 may be connected between the fuel line 36 and fuel fill fitting 18 by welding both the bottom end of the fuel fill fitting 18 to the upper cylindrical collar 56 and the lower cylindrical collar 38 within the top end of the fuel filler line 36 to produce a permanent seal.

The drawings show the device 10 used in the boat 22, in which the fuel fill fitting 18 is mounted into the deck 20. Other motor vehicles, such as automobiles, trucks, vans, motorcycles, etc. can utilize the device 10, to prevent fuel spills. The device may be adapted for use within the fuel line of any vehicle using a liquid fuel and the description and drawings are not meant to limit the application of the present invention.

In operation, the fuel spill collector device 24 is connected between the fuel line 36 and the fuel fill fitting 18. This may be performed by either welding the lower cylindrical collar 38 to the fuel filler line 36 and welding the upper cylindrical collar 56 to the fuel fill fitting 18. Alternatively, the lower cylindrical collar 38 may be inserted within the fuel filler line 36 and securing a clamp 66 therearound to create a pressure fit with the lower cylindrical collar 38. A flexible tube 62 is then connected between the upper cylindrical collar 56 and the fuel fill fitting 18. A first hose clamp 64 will then be secured around the flexible tube 62 at a point through which the fuel fill fitting 18 extends to secure the flexible tube 62 to the fuel fill fitting 18. A second hose clamp is then secured around the flexible tube 62 at a point through which the upper cylindrical collar 56 extends to secure the flexible tube 62 to the upper cylindrical collar 56. The fuel fill fitting 18 is thus secured to the upper cylindrical collar 56 via the flexible tube 62.

The nozzle 14 of the fuel pump 16 is then inserted into the fuel fill fitting 18 so as to extend through the upper cylindrical collar 56 whereby a releasable seal is formed between the nozzle 14 and the cover 48, through the hollow body 26 and into the nozzle receiving member 32. When fuel is pumped through the nozzle 14 it is deposited directly into the fuel line 36 through which it travels for placement in the fuel tank 37. The pressure at which the fuel is pumped into the fuel line 36 causes some fuel to be splashed back towards the nozzle 14 and the fuel fill fitting 18. This fuel splash back is caught by the hollow body 26 and redeposited into the fuel line 36 for transport to the fuel tank 37. The releasable seal formed either between the cover 48 and the nozzle 14 or the O-ring and the nozzle 14 act as a further barrier for the fuel splash back to thereby retain the fuel from exiting the fuel fill fitting 18 and thus preventing a fuel spill.

Once the fuel tank is full or enough fuel has been deposited into the fuel line, the fuel pump nozzle is removed from the fuel spill collector device and the fuel fill fitting is sealed closed. When more fuel must be deposited into the fuel tank, the fuel fill fitting is unsealed and the process of inserting the nozzle and depositing fuel into the fuel line is repeated.

LIST OF REFERENCE NUMBERS 12 fuel spill
14 nozzle
16 fuel pump
18 fuel fill fitting
20 deck
22 boat
24 fuel spill collector device
26 hollow body of the fuel spill collector device
28 open top end of the hollow body
30 open bottom end of the hollow body
32 nozzle receiving member at the open bottom end
34 entrance flow guide member at the open top end
36 fuel filler line
37 fuel tank
38 lower cylindrical collar for the nozzle receiving member
40 cylindrical cup-shaped housing for the hollow body
42 upper cylindrical collar for the entrance flow guide member
44 internal ring-shaped groove in the upper cylindrical collar
46 upper edge of the upper cylindrical collar
48 disk-shaped flexible cover
50 bead on the disk-shaped flexible cover
52 cross-shaped slot in the disk-shaped flexible cover
58 first connecting facility
60 second connecting facility
62 flexible tube of the first connecting facility
63 hose clamp of the first connecting facility
64 hose clamp for the second connecting facility
70 truncated conical housing for the hollow body
72 upper cylindrical collar of the entrance flow guide member
74 external threads on the upper cylindrical collar
75 outer side of cylindrical sleeve
76 cylindrical sleeve
77 skirt
78 internal threads on the cylindrical sleeve
79 inner side of sleeve
80 internal ring-shaped groove in the cylindrical sleeve
82 upper edge of the cylindrical sleeve
90 deflector plate
104 cylindrical cap of the entrance flow guide member
106 central aperture in the cylindrical cap
108 short tube of the entrance flow guide member
110 internal annular channel in the short tube
112 O-ring in the internal annular channel
114 upper open end of the short tube It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fuel spill collector device for connection between a fuel line and fuel fill fitting, for collecting fuel inserted into the fuel line by a fuel pump nozzle, said fuel spill collector device, fuel line, fuel fill fitting and fuel pump nozzle, in combination, comprising:

a) means comprising a hollow body for catching splash back of fuel having an open top end and an open bottom end;

b) a nozzle receiving member positioned at said open bottom end of said hollow body and connected to the fuel line for receiving the fuel pump nozzle during fueling allowing fuel to be delivered directly to the fuel line thereby enabling fuel to flow at a maximum available rate, said hollow body having a cross section which is larger than the cross section of said fuel line thereby forming an enlarged chamber between said fuel line and the open top end of said hollow body;

c) an entrance flow guide member positioned at said open top end of said hollow body connected to the fuel fill fitting for releasably sealing the fuel pump nozzle inserted therein and having a larger cross section area than said hollow body, said entrance flow guide member including a flexible disk covering said open top end of said hollow body, said disk having a cross shaped slit through which said nozzle passes, said fuel pump nozzle extending through said entrance flow guide member, said hollow body and said nozzle receiving member to pump fuel directly into the fuel filler line, the combination of said disk and said enlarged chamber insuring that a fuel back splash will be caught within said hollow body and said releasable seal between said entrance flow guide member and the fuel pump nozzle will prevent any fuel from exiting said hollow body, suppress fumes and greatly decrease fueling time by virtue of delivering fuel directly into the fuel line.

2. The fuel spill collector device as recited in claim 1, further comprising a deflector plate positioned within said hollow body for diverting fuel entering said hollow body and aiding in prevention of fuel back splash and suppression of fumes when the fuel pump nozzle is inserted into the fuel fill fitting.

3. The fuel spill collector device as recited in claim 1, wherein said nozzle receiving member includes a lower cylindrical collar extending from said open bottom side and said entrance flow guide member includes an upper cylindrical collar extending from said open top side.

4. The fuel spill collector device as recited in claim 3, further comprising:

a) first means for connecting said upper cylindrical collar to said fuel fill fitting including a flexible tube extending between said upper cylindrical collar and said fuel fill fitting, a first hose clamp sealing said flexible tube to the fuel fill fitting and a second hose clamp sealing said flexible tube to said upper cylindrical collar; and b) second means for connecting said lower cylindrical collar to the fuel line including a third hose clamp for sealing said lower cylindrical collar to the fuel line.

5. The fuel spill collector device as recited in claim 3, wherein said upper cylindrical collar includes an inner side and a ring-shaped groove extending around said inner side and said entrance flow guide member further includes a bead extending around an outer periphery thereof, said bead being positioned within said ring-shaped groove.

6. The fuel spill collector device as recited in claim 3, wherein said upper cylindrical collar includes an outer side and a thread spiraling around said outer side and said entrance flow guide member includes:

a) a cylindrical sleeve including an inner side having a ring-shaped groove extending around said inner side and a thread spiraling around the inner side for mating with said thread spiraling around said outer side of said upper cylindrical collar; and b) said disk shaped cover including a bead extending about an outer periphery thereof, said bead being positioned within said ring-shaped groove.

7. The fuel spill collector as recited in claim 3, wherein said upper cylindrical collar is welded to the fuel fill fitting and said lower cylindrical collar is welded to the fuel line.

* * * * *